H. AASS.
AUTOMATIC COCK VALVE.
APPLICATION FILED MAY 25, 1921.
1,435,781.
Patented Nov. 14, 1922.
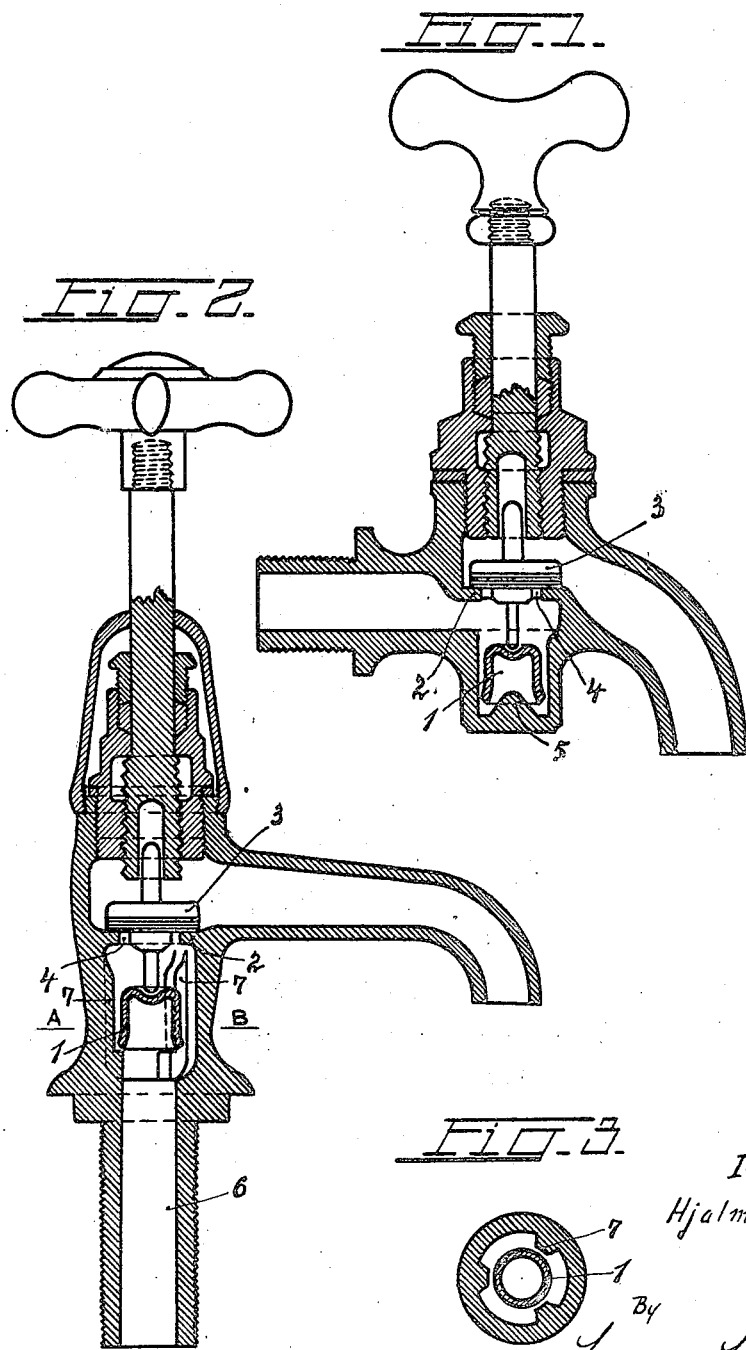
Inventor:
Hjalmar Aass
By
Lawrence Langner
Atty Patented Nov. 14, 1922.

1,435,781

UNITED STATES PATENT OFFICE.

HJALMAR AASS, OF CHRISTIANIA, NORWAY.

AUTOMATIC COCK VALVE.

Application filed May 25, 1921. Serial No. 472,331.

*To all whom it may concern:*

Be it known that I, HJALMAR AASS, a subject of the King of Norway, residing at Christiania, Norway, have invented certain new and useful Improvements in Automatic Cock Valves; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to the kind of cock valves which is adapted to automatically shut off the outlet from the inside of the valve seat, when the usual or main valve is removed, and according to the invention the automatic valve comprises a cup-shaped member, which is so shaped that it can be introduced through the valve seat opening from outside, whereupon it is expanded along its circumference by being pressed against a cone shaped projection or abutment in the bottom of the cock casing or by means of a suitable tool or the like, so that it acts as a valve.

Two different forms of the invention are illustrated on the accompanying drawing:

Fig. 1 is a section through a cock with side inlet.

Fig. 2 is a corresponding section through a cock with bottom inlet.

Fig. 3 is a section on the line A—B of Fig. 2.

The automatic or auxiliary valve 1 is placed as usual behind the valve seat 2 and is pressed by the liquid against said seat from the inside when the main valve 3 is removed.

According to the invention the automatic valve body has the form of a cup, the diameter of which is a little smaller than the inside diameter of the valve seat, so that it may be introduced through the valve seat opening 4 from the outside, whereupon it is expanded along its rim in such a manner that it can not pass through said opening 4, but is adapted to act as a valve on the inside of the valve seat.

According to the form of the invention illustrated on Fig. 1 the expansion of member 1 is caused by means of a conical abutment 5 extending upwardly from the bottom of the cock housing co-axially with the valve spindle, and the cup-shaped valve body is pressed against said conical abutment by means of a tool (not shown) introduced from above.

According to the form of the invention illustrated on Fig. 2 the expansion of member 1 after its having been introduced from above takes place by means of a suitable tool (not shown) introduced through the tube opening 6.

According to this form of the invention the valve 1 is guided in the housing between ribs 7, as will be seen from Fig. 3.

Claims:

1. In a device of the class described, a valve housing and a main valve, an automatic valve adapted to shut off the outlet from inside the valve seat when the main valve is removed, said automatic valve being cup-shaped and having its rim expanded, and means for expanding the rim of the cup-shaped valve after it has been passed from the outside through the valve seat opening in order to adapt it to act as an automatic valve.

2. In a device of the class described, a valve housing and a main valve, an automatic valve adapted to shut off the outlet from inside the valve seat when the main valve is removed, said automatic valve being cup-shaped and having its rim expanded, and a conical abutment in the valve housing for expanding the rim of the cup-shaped valve after it has been passed from the outside through the valve seat opening in order to adapt it to act as an automatic valve.

In testimony that I claim the foregoing as my invention, I have signed my name in presence of two subscribing witnesses.

HJALMAR AASS.

Witnesses:
MORGAN BUGGE,
L. DALE POPE.